March 26, 1935.  C. I. LOTT  1,995,571
UNIT BEARING
Filed Nov. 20, 1933
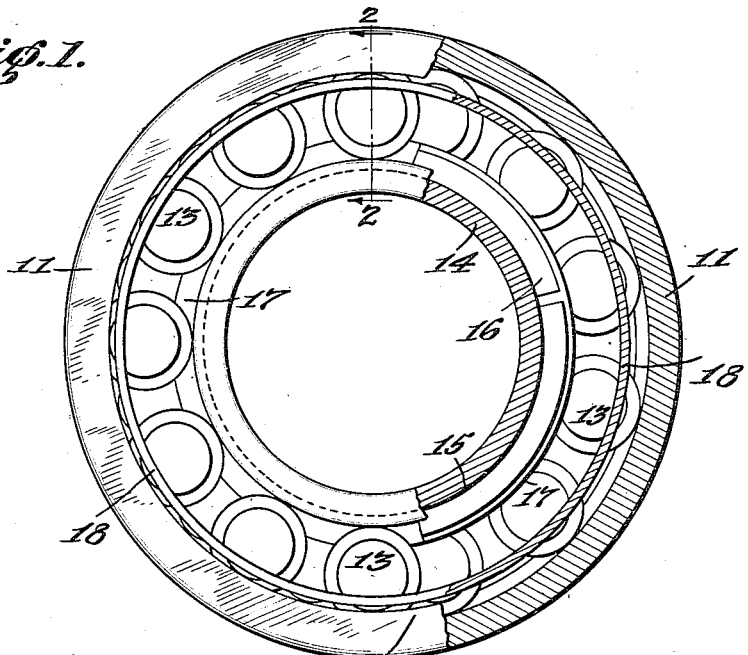
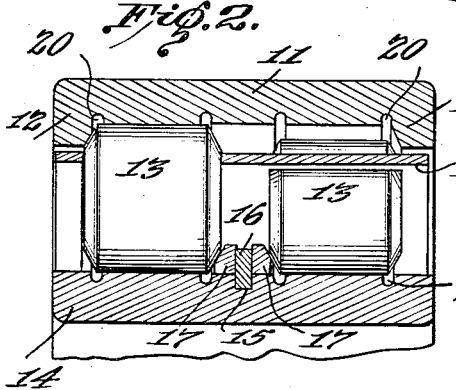
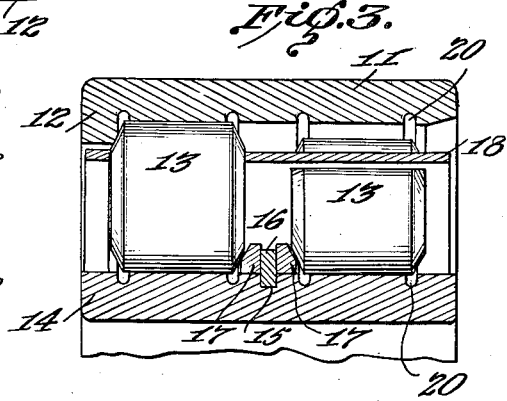
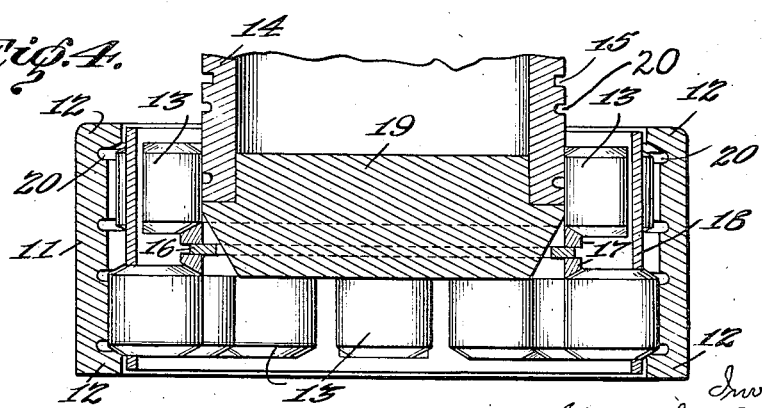
Inventor
Charles Ira Lott
By Sommers + Young Attorneys Patented Mar. 26, 1935

1,995,571

UNITED STATES PATENT OFFICE 1,995,571

UNIT BEARING

Charles Ira Lott, Lansing, Mich.

Application November 20, 1933, Serial No. 698,895

3 Claims. (Cl. 308—212)

This invention relates to bearings of the unit type and particularly to one in which each of two series of rolling members transmits the entire end thrust from one sleeve to a concentric companion sleeve in one direction only while a thrust in the opposite direction is transmitted by the other series of rollers only.

In the accompanying drawing:

Fig. 1 is an end view partly in section of a bearing according to this invention;

Fig. 2 is a radial section partly broken away;

Fig. 3 is a view similar to Fig. 2 showing a modification; and

Fig. 4 illustrates the method of assembling the bearing.

In these figures 11 represents an outer sleeve having integral terminal flanges 12, which are preferably tapered as shown, 13 rolling members arranged in two annular series which members may be either two series of cylindrical rollers, preferably with frusto-conical ends, a series of balls and a series of cylindrical rollers or two series of balls, and 14 an inner sleeve provided with an external groove 15.

A resilient split locking collar or divided spring ring 16 which closely fits in the groove 15 projects above the sleeve 14 and serves as a rigid abutment for two oppositely facing continuous rings 17 preferably beveled as shown. Each ring 17 abuts against the inner ends of one series of rolling members while a cage 18 holds all of the members 13 properly spaced.

The inner and outer sleeves 11 and 14 are preferably provided with annular grooves 20 adjacent each end of the rollers to eliminate contact of the roller corners with the sleeves, this construction being somewhat similar to that disclosed in my prior Patent No. 1,917,452 dated July 11, 1933.

The bearing may be assembled by placing the sleeve 11 within a magnetic field, inserting the concentric cage 18, inserting one series of rolling members 13 which are held in place by magnetic force, then inserting in succession a ring 17, the divided spring ring 16, a companion ring 17, and a second series of rolling members 13. For the purpose of expanding the ring 16 a removable frusto-conical plug 19 is placed in one end of the sleeve 14 which is then pressed inside the concentric bearing members previously assembled. When the ring 16 comes into alignment with the groove 15, it suddenly contracts and forms a permanent lock for all parts of the bearing.

In the modification shown in Fig. 3 one of the flanges 12 is omitted which permits the removal of the sleeve 11' from the remainder of the bearing, the cage 18 and ring 16 holding the remaining elements against separation.

In this bearing it is essential that the thrust load on the rolling members be transmitted from and to an unbroken bearing face as otherwise the bearing will not give satisfactory service and, after a brief period of use, will be so seriously worn or damaged as to require replacement. In the bearing the flanges 12 and the rings 17 provide the necessary unbroken surfaces, and the split spring ring 15 does not make rolling contact with any part of the bearing. By the use of the central abutment, objectionable friction losses are avoided which necessarily result from transmitting thrusts through a plurality of series of rolling members and, as in either form, a single flange on a sleeve receives the entire thrust on that sleeve. The bearing can be so designed as to safely carry the thrust loads.

Various modifications may obviously be made within the scope of this invention, for instance, the terminal integral bearing flange may be on the inner sleeve or the bearing rings 17 may be integrally united, a sufficiently deep groove being left to permit the spring 16 to be stretched over the sleeve when the bearing is assembled.

I claim:

1. In a unit bearing, the combination with a one-piece sleeve having an integral unmutilated terminal flange, of a concentric one-piece sleeve having a central annular groove opening in the direction of said first sleeve, a one-piece split spring ring seated in said groove, a continuous bearing ring on each side of said spring ring, two series of rolling members separated by and fitting against said bearing rings, and a cage holding said rolling members properly spaced.

2. In a bearing, the combination with a one-piece sleeve having an integral unmutilated terminal flange, of a concentric one-piece sleeve having a recess opening in the direction of said first sleeve, a continuous bearing ring adapted to slide over the recessed face of the second sleeve, a one-piece resilient split collar resiliently seated in said recess and extending out of said recess and serving as an abutment for said bearing ring, two series of rolling members on opposite sides of said bearing ring and collar, and a cage holding said rolling members properly spaced.

3. In a unit bearing, the combination with an outer one-piece sleeve having integral terminal thrust receiving unmutilated flanges, of a concentric one-piece sleeve having near its midsection an annular groove, of a split spring ring adapted to be forced over the grooved face of said sleeve, said spring ring being resiliently retained in said groove, two continuous bearing rings adapted to slide over the grooved face of said second sleeve abutting against opposite sides of said spring ring, two annular series of rolling members fitting the space between said sleeves each bearing against one of said bearing rings, and a cage for spacing said rolling members.

CHARLES IRA LOTT.